United States Patent
Heller, Jr. et al.

(10) Patent No.: US 7,647,519 B2
(45) Date of Patent: *Jan. 12, 2010

(54) SYSTEM AND COMPUTER PROGRAM PRODUCT FOR DYNAMICALLY MANAGING POWER IN MICROPROCESSOR CHIPS ACCORDING TO PRESENT PROCESSING DEMANDS

(75) Inventors: Thomas J. Heller, Jr., Rhinebeck, NY (US); Michael Ignatowski, Red Hook, NY (US); Bernard S. Meyerson, Yorktown Heights, NY (US); James W. Rymarczyk, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 12/131,507

(22) Filed: Jun. 2, 2008

(65) Prior Publication Data

US 2008/0229128 A1 Sep. 18, 2008

Related U.S. Application Data

(63) Continuation of application No. 10/860,407, filed on Jun. 3, 2004, now Pat. No. 7,401,240.

(51) Int. Cl.
*G06F 1/26* (2006.01)
*G06F 1/32* (2006.01)

(52) U.S. Cl. .............. 713/320; 713/300; 713/323; 713/324; 713/330; 714/14; 714/22

(58) Field of Classification Search ............... 713/320, 713/300, 323, 324, 330; 714/14, 22

See application file for complete search history.

(56) References Cited

U.S. PATENT DOCUMENTS

| 5,634,131 A | 5/1997 | Matter et al. |
| 5,918,061 A * | 6/1999 | Nikjou ...................... 713/324 |
| 5,996,083 A | 11/1999 | Gupta et al. |
| 6,141,762 A | 10/2000 | Nicol et al. |

(Continued)

FOREIGN PATENT DOCUMENTS

WO WO 2004034251 4/2004

OTHER PUBLICATIONS

San Martin et al., "Power-Profiler: Optimizing ASICS Power Consumption at the Behavioral Level", IEEE, New York, US, Vol. Conf. 32, Jun. 12, 1995, XP000546316, pp. 42-47.

(Continued)

*Primary Examiner*—Thomas Lee
*Assistant Examiner*—Michael J Brown
(74) *Attorney, Agent, or Firm*—Yee & Associates, P.C.; Diana R. Gerhardt (57) ABSTRACT

A method, system, and computer program product are disclosed for dynamically managing power in a microprocessor chip that includes physical hardware elements within the microprocessor chip. A process is selected to be executed. Hardware elements that are necessary to execute the process are then identified. The power in the microprocessor chip is dynamically altered by altering a present power state of the hardware elements that were identified as being necessary.

22 Claims, 5 Drawing Sheets

U.S. PATENT DOCUMENTS

| | | |
|---|---|---|
| 6,219,796 B1 | 4/2001 | Bartley |
| 6,477,654 B1 * | 11/2002 | Dean et al. .................. 713/300 |
| 6,625,740 B1 | 9/2003 | Datar et al. |
| 6,711,691 B1 | 3/2004 | Howard et al. |
| 6,938,176 B1 | 8/2005 | Alben et al. |
| 7,028,197 B2 | 4/2006 | Subramanian et al. |
| 7,143,299 B1 | 11/2006 | Rubinstein et al. |
| 2002/0138777 A1 | 9/2002 | Feierbach |
| 2003/0196129 A1 | 10/2003 | Lin |
| 2006/0069936 A1 | 3/2006 | Lint et al. |

OTHER PUBLICATIONS

Melear, "Hardware and Software Techniques for Power Conservation in Portable Devices", Wescon Conference, IEEE Center, Hoes Lane US, Sep. 1994, XP000532610, pp. 453-461.

* cited by examiner

SYSTEM AND COMPUTER PROGRAM PRODUCT FOR DYNAMICALLY MANAGING POWER IN MICROPROCESSOR CHIPS ACCORDING TO PRESENT PROCESSING DEMANDS

This application is a continuation of application number 10/860,407, filed Jun. 3, 2004, status allowed.

BACKGROUND OF THE INVENTION

1. Technical Field

The present invention relates generally to the field of data processing systems, and more specifically to a method, system, and computer program product for dynamically managing power within a microprocessor chip by selectively altering the present power state of individual physical hardware elements included in the chip according to the present processing demands placed on the chip.

2. Description of Related Art

A microprocessor chip is a device that is fabricated using a single piece of silicon. The microprocessor chip may also be called a chip or an integrated circuit. One or more hardware elements are fabricated on the single microprocessor chip. The hardware elements generally include processing cores and caches, but may also include special functional elements such as compression engines, encryption engines, protocol processing engines, architecture emulation engines, and data stream processing engines. The number of hardware elements that are included in a microprocessor chip is increasing over time driven by two factors: (1) technology advances are enabling more circuits to be packaged per chip, soon reaching the levels of billions of circuits per chip, and (2) the performance improvement for a single core ("single thread performance") is slowing down because of slowing improvements in circuit speed and diminishing returns in instruction-level parallelism.

A processing core also includes multiple sub-elements such as a floating point unit, a load/store unit, an instruction sequencing unit, a fixed point execution unit, an instruction fetch unit, a branch execution unit, and possibly other sub-elements. Some processing cores include several instances of the same type of unit. For example, a processing core may include several separate floating point units and/or several separate load/store units. The terms "processing core" and "processor" are used interchangeably herein to refer to the same device.

Microprocessor chip performance will increasingly be limited by power dissipation as the scaling of the technology results in unacceptable power density increases. This power dissipation is increasingly due to leakage current that is independent of whether or not a given circuit is active. Thus, inactive hardware elements that are powered-on will dissipate essentially as much power as if they were active.

The various hardware elements included in a single microprocessor chip receive power that is distributed throughout the microprocessor chip. One method for distributing power is to provide a power plane within the microprocessor chip. The hardware elements in the microprocessor chip receive power from the power plane.

The trend in the industry has been to continually increase the density of the circuitry in the microprocessor chip which increases the number of hardware elements that are included in a single microprocessor chip. Thus, many hardware elements will be integrated within one single microprocessor chip.

Depending on the particular work being done by the chip, some of the hardware elements will be required while others are not used. In some cases, a significant number of the hardware elements may not be needed during a particular period of time. In other cases, limitations in the power supply infrastructure or limitations in the microprocessor cooling system will not allow all the elements of a single microprocessor chip to be active simultaneously. This is particularly true during the typical function testing of unpackaged chips, or testing used to increase microprocessor hardware reliability. Reliability testing is done under conditions of elevated temperature and elevated voltage and therefore causes the microprocessor chip to dissipate peak power. The current generation of testing equipment will be unable to supply the required power to test the next generation of highly integrated microprocessors which contain large numbers of hardware elements.

Permitting unused hardware elements to remain powered-on, or powered-on in an idle state during normal operations, will also require the chip to dissipate unnecessary power. Therefore, a need exists for a method, system, and product for dynamically managing power in a microprocessor chip by selectively altering the present power state of individual hardware elements included in the microprocessor chip according to the present processing demands placed on the microprocessor chip.

SUMMARY OF THE INVENTION

A method, system, and computer program product are disclosed for dynamically managing power in a microprocessor chip that includes physical hardware elements within the microprocessor chip. The power state of each hardware element in the microprocessor chip is controlled independently from the power state of the other hardware elements included in the microprocessor chip. For example, power can be simultaneously turned-on for one hardware element in the microprocessor chip and turned off for all other hardware elements in that same microprocessor chip.

This invention employs a hypervisor, which is a software or firmware component that dynamically dispatches virtual processors to physical processors. When the hypervisor selects a virtual processor to be executed for an interval of time (a "time slice"), it will know which hardware elements are necessary to execute the virtual processor, and it will therefore dynamically alter the present power state of the hardware elements within the microprocessor chip such that only the necessary elements are powered-on for the next time slice.

In addition, the power to the various hardware sub-elements that are included within a single processing core may also be controlled independently from the power state of all other hardware sub-elements in that processing core. Thus, when a processing core includes several load/store units, for example, and only one load/store unit is required, power to the second load/store unit may be turned off while the power to the rest of the hardware sub-elements in the processing core remains turned on.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, system, and product for dynamically managing power in a microprocessor chip by selectively altering the power state of individual hardware circuit elements and sub-elements according to the present processing demands placed on the microprocessor chip. A plurality of different hardware elements is included within the microprocessor chip. The power to each individual hardware element in a microprocessor chip may be controlled separately from all of the other hardware elements in the microprocessor chip. In addition, the power to some sub-elements of a processing core may also be controlled separately from the other sub-elements of the core. Thus, the power state of each hardware element and sub-element may be individually and separately controlled.

A determination is made at particular intervals of time as to whether the present power state of individual hardware elements or sub-elements should be altered. If a determination is made that the power state to an individual hardware element or sub-element should be altered, the power state is altered.

Selected hardware elements and sub-elements are powered-on if they were not already powered-on. Hardware elements and sub-elements that had been powered-on to execute a previous process but that are not necessary to execute the current process are then powered-off. Thus, necessary hardware elements and sub-elements are turned on and unnecessary hardware elements and sub-elements are turned off.

Some hardware elements are dedicated to and used exclusively by a physical processing core. Other hardware elements are shared by more than one processing cores. When a hardware element is shared, it is not used exclusively by just one physical processing core. According to the present invention, when the power state of a processing core is altered, the power state of hardware elements that are dedicated to that processing core are also altered in a similar manner. Thus, if the power to a particular processing core is to be turned completely off, the power to all hardware elements that are dedicated to that particular processing core will also be turned completely off. Power to hardware elements that are shared with other processing cores is not altered unless the number of active cores that require that shared element transitions to or from zero. That is, the hypervisor keeps track of which cores are running virtual processors that need a given shared element, and will only keep the shared element powered-on if an active core needs it.

A determination is made as to whether to alter the power state of a hardware element or sub-element at the time that hardware elements and sub-elements are assigned to a virtual server. Therefore, the power states of the various hardware elements and sub-elements in a microprocessor chip can change at particular intervals of time. According to the preferred embodiment, this interval of time occurs when a virtual processor is dispatched to the physical processor and its associated hardware elements. A virtual processor is dispatched when particular hardware elements and sub-elements are selected to be used to implement the virtual processor.

A virtual processor specifies a processing core, sub-elements that are necessary within that core, and any hardware elements that are part of the microprocessor chip that are necessary. These hardware elements and sub-elements may be required to be dedicated to the processing core or they may be shared with other processing cores.

Thus, for example, a virtual processor may require a processing core, one load/store unit within that core, and one encryption unit. When that virtual processor is dispatched, a particular processing core within a particular microprocessor chip is selected by the hypervisor. If the processing core includes two or more load/store units, one is selected. If the microprocessor chip includes several encryption units, one is selected. Thus, when a virtual processor is dispatched, a processing core and all necessary hardware elements and sub-elements that are needed for that virtual processor are also selected. These necessary hardware elements may be dedicated to this particular processing core, or they may be shared with other processing cores.

The present invention is implemented using a hypervisor which is responsible for implementing the virtual servers in a data processing system, including managing the time-sharing of physical processors among many different virtual processors. The hypervisor dynamically assigns each virtual processor to a physical processor and its associated hardware elements, which will then be used to execute the virtual processor. The hypervisor sets a time limit when a virtual processor is assigned to a physical processor. The physical processor then executes the virtual processor until the time limit expires. When the time limit, also called a time slice, expires, control of the physical processor reverts back to the hypervisor which then selects the next virtual processor to be assigned, or dispatched, to this physical processor.

As used herein, the term "physical processor" refers to a processing core and may include other hardware elements that are either dedicated to that core or shared by multiple cores. Thus, a physical processor is a processing core and hardware elements that are either dedicated to or shared by that processing core.

In the environment of the present invention, a virtual processor is selected by the hypervisor to next be executed or "dispatched". When a virtual processor is dispatched to a particular physical processor, hardware elements of the physical processor are selected which will be used to execute the virtual processor. These selected hardware elements of the particular physical processor are then powered-on and the remaining unnecessary hardware elements in the microprocessor chip are powered-off. In addition, hardware sub-elements in a single core are selected. These selected hardware sub-elements are powered-on. Any unnecessary hardware sub-elements in that core are powered-off.

When the hypervisor dispatches a virtual processor, it loads the registers that are needed by the virtual processor from an area in memory, called a virtual processor state descriptor, where they were saved when the virtual processor was last undispatched. The virtual processor state descriptor also tells the hypervisor which physical processor hardware elements, and which hardware sub-elements in the core, are required by that virtual processor. In this manner, the hypervisor knows at dispatch time which hardware elements and hardware sub-elements are necessary in order to execute the virtual processor.

The information in the virtual processor state descriptor regarding which hardware elements and sub-elements will be needed can be established in several ways, including (1) having the values specified manually at the time that a virtual server and its virtual processors are defined or (2) through a dynamic discovery process where the requirement for a hardware element or sub-element is discovered and recorded by the hypervisor on the first instance of use by the virtual processor, the discovery being communicated to the hypervisor through a hardware interruption or trap event.

According to the present invention, the power states of the hardware elements and sub-elements are dynamically controlled at a time-slice level. Each time-slice level is the particular interval of time described above. After the expiration of each time-slice, the hypervisor can dynamically alter the power state of any, all, or some of the hardware elements or sub-elements in a microprocessor chip.

The time slice interval, the period between successive dispatching operations to physical hardware elements and sub-elements, is typically on the order of a millisecond. The time required to power a hardware element or sub-element on or off is much shorter, perhaps only 50 nanoseconds. Also, the changing of power states for multiple hardware elements and sub-elements can generally be done concurrently, and also may be overlapped in part with other work that the hypervisor must do in dispatching a new virtual processor. Thus, the performance impact of altering power states is very small.

The hypervisor is aware of the current state of the system and thus knows which hardware elements and sub-elements are currently in use, i.e. which hardware elements and sub-elements are currently powered-on and which are currently powered-off. In addition, the hypervisor knows which hardware elements and sub-elements had been used by the virtual processor which just completed its processing. Therefore, the hypervisor knows which hardware elements and sub-elements are currently powered-on but are no longer needed. The hypervisor maintains this knowledge preferably through a profile of hardware elements and sub-elements. The profile can be created either through a definition process and/or through a discovery process in which the first use of a hardware element by a virtual processor causes the hardware element to be added to the virtual processor's profile.

The individual power controls for the hardware elements and sub-elements are logically aggregated and accessed through a centralized control register included in each microprocessor chip which specifies whether the power being received by each particular hardware element and sub-element is full power, or no power including neither active nor leakage power. The contents of this centralized control register can be modified by signals generated either internally or externally to the microprocessor chip. Alternative embodiments could include low power states other than fully off, depending in part upon the specific technology.

When an element or sub-element is powered off according to the preferred embodiment, it receives neither active nor leakage power. Thus, according to the preferred embodiment, unnecessary elements and sub-elements are powered-off and are not just idled in a state where they receive low power.

When the power for an element is switched on, the preferred embodiment requires that the element initialize itself to a suitable state to begin operation. Therefore, each hardware element will preferably include a storage device within which may be stored state information. In another embodiment, instead of providing a storage device in each hardware element, the element may retain some or all of its state from the last time it was powered on by using a small amount of circuitry that would remain powered on either fully or in a low power state regardless of the power state of the rest of that hardware element.

The present invention can be used to optimize the hardware element power control to achieve different goals and deal with different constraints. For example, if the hypervisor turns off hardware elements and sub-elements when they are not in actual use, the net effect would be for the power consumption of the microprocessor chip to approximately track the resource utilization level for that chip.

Another example would take advantage of the fact that the hypervisor controls the selection of physical processing cores that will execute the virtual processors. Specific constraints could be avoided by controlling which physical processing cores are selected to execute virtual processors. The hypervisor could reduce the processing to be done by a specific microprocessor chip or specific hardware elements within a single microprocessor chip by forcing more idle time or by assigning less demanding work to hardware resources that are approaching or reaching their specified power limits.

The present invention provides many advantages over the prior art. The following are examples of environments within which the present invention will reduce the power consumption of a microprocessor chip: an environment where variable workloads need multiple processing cores during peak periods but only one processing core during average periods, an environment where workloads need fewer cores than are available on an microprocessor chip in order to achieve balanced processor-to-memory performance (e.g., high performance computing applications that are memory bandwidth limited and cannot effectively use all the cores that were placed on the chip for full use by commercial workloads), an environment where commercial workloads have no use for on-chip vector/streaming engines, and an environment where workloads have no use for on-chip encryption or protocol processing engines.

The present invention also provides other advantages. The average power consumption and heat dissipation for microprocessor chips can be reduced by an amount that is roughly proportional to their average capacity utilization. The present invention can be used to dynamically balance power among many different microprocessor chips in a system.

The present invention can be used to limit the power dissipation of microprocessor chips during testing of the chips which causes the individual hardware elements to reach peak power. For example, the present invention can be used during reliability testing of a microprocessor chip involving elevated temperature and elevated voltage of the chip and that causes the microprocessor chip to dissipate peak power.

Figure 1:
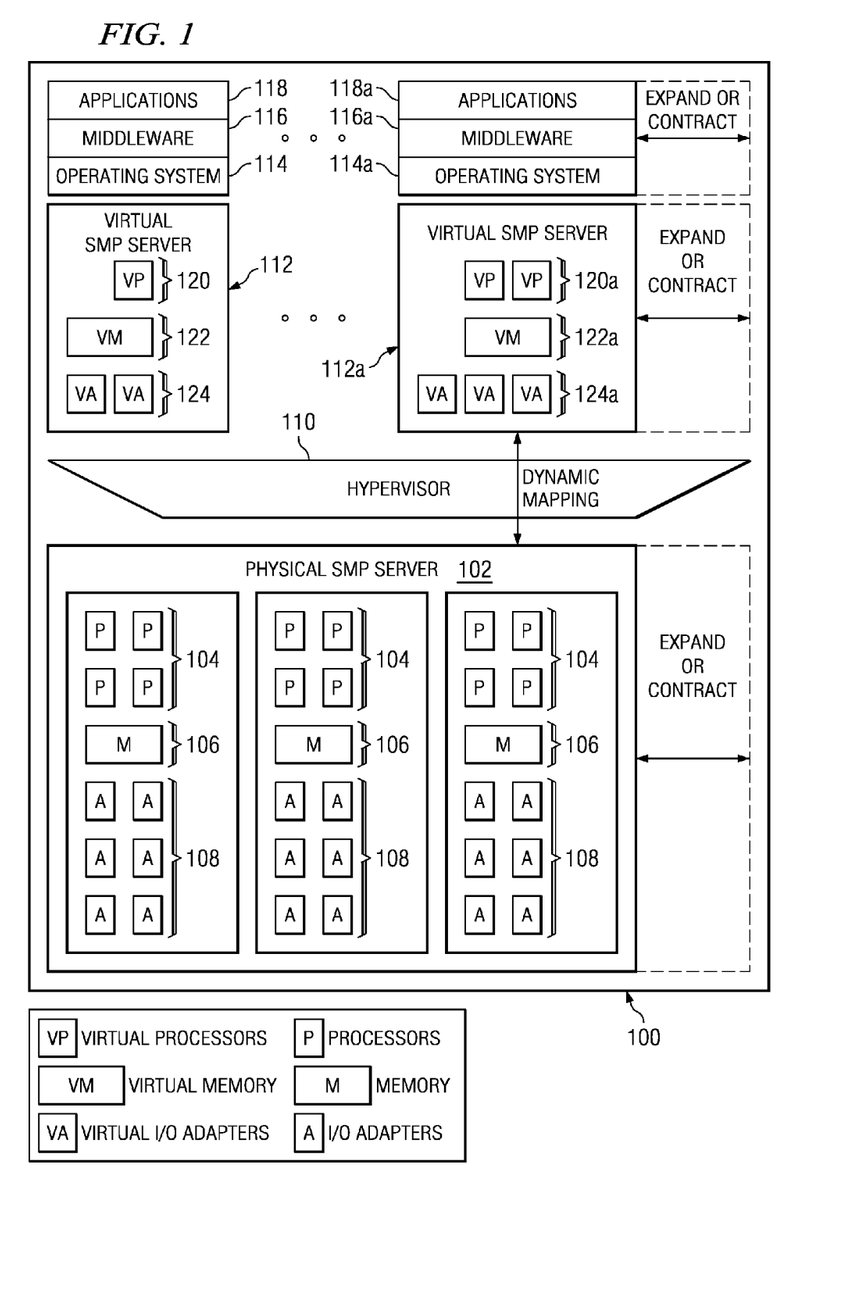
FIG. 1 is a block diagram of a data processing system, including a hypervisor, in accordance with the present invention.

FIG. 1 is a block diagram of a data processing system 100, including a hypervisor, in which the present invention may be implemented. System 100 is preferably a symmetric multiprocessing (SMP) server computer system. SMP server computer system 100 includes physical hardware devices that can be mapped to, i.e. temporarily owned by, a user application to execute that application.

SMP server computer system 100 includes a physical SMP server 102. Physical SMP server 102 includes physical hardware devices such as processors 104, memory 106, and I/O adapters 108. These physical devices are managed by hypervisor 110.

A virtual server is a proxy for a physical server that has the same capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processors), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamical resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
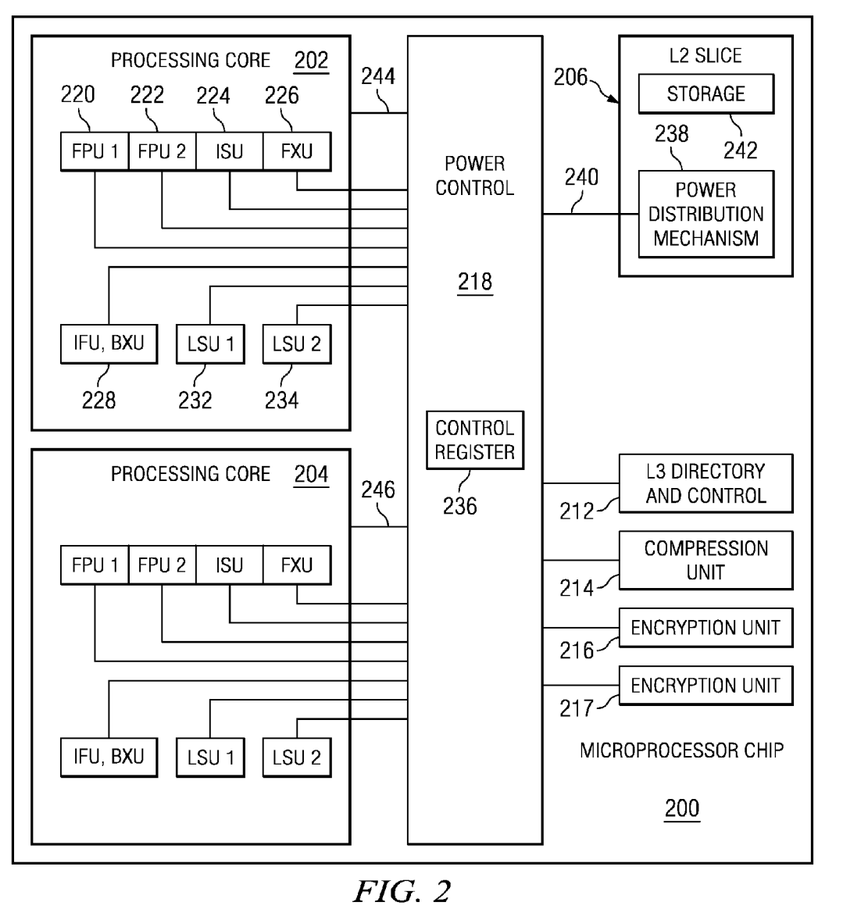
FIG. 2 is a block diagram of a microprocessor chip that includes within it multiple different hardware elements in accordance with the present invention.

FIG. 2 is a block diagram of an example of a microprocessor chip 200 that within it includes multiple different hardware elements in accordance with the present invention.

Microprocessor chip 200 includes a processing core 202, a processing core 204, an L2 cache 206, an L3 cache directory and control 212, a compression unit 214, an encryption unit 216, encryption unit 217, and a power control unit 218. Processing core 202, processing core 204, L2 cache 206, L3 cache directory and control 212, compression unit 214, encryption unit 216, and power control unit 218 are hardware elements.

Each hardware element may also include hardware—sub-elements. For example, processing core 202 includes hardware sub-elements: floating point unit (FPU 1) 220, floating point unit (FPU 2) 222, instruction sequencing unit (ISU) 224, fixed point unit (FXU) 226, instruction fetch unit/branch execution unit (IFU, BXU) 228, load/store unit (LSU 1) 232, and load/store unit (LSU 2) 234. The power to each hardware element and each hardware sub-element can be controlled separately and independently from the other hardware elements and hardware sub-elements. Other processing cores, such as processing core 204, may also include these or other sub-elements where the power to each sub-element can be controlled separately from all other hardware elements and sub-elements.

As an example, FPU1 220, ISU 224, FXU 226, IFU/BXU 238, and LSU 1 232 may be powered-on while FPU 2 222 and LSU 2 234 are concurrently powered-off.

Microprocessor chip 200 includes power control unit 218. Power control unit 218 includes a control register 236. Control register 236 includes a bit for each hardware element and each hardware sub-element. Thus, control register 236 includes a bit for FPU 1 220, a bit for FPU 2 222, a bit for ISU 224, a bit for FXU 226, a bit for IFU/BXU 228, a bit for LSU 1 232, and a bit for LSU 2 234. Control register 236 also includes a bit for L2 cache 206, a bit for L3 directory and control 212, a bit for compression unit 214, and a bit for encryption unit 216.

Thus, the power to each one of the hardware elements and hardware sub-elements may be controlled utilizing control register 236 by setting and clearing the bits in control register 236. For example, each hardware element and hardware sub-element that has its bit set will be powered-on, and each hardware element and hardware sub-element that has its bit cleared will be powered-off.

Hypervisor 110 will control the power to each hardware element and sub-element using control register 236. Hypervisor 110 will set and clear bits as appropriate in order to selectively power each individual hardware elements and sub-element.

The power to each hardware sub-element in a processing core may be controlled independently from the power to the other sub-elements in that core. In addition, power to the entire processor core may be controlled. For example, control register 236 may also include a bit for processing core 202 and a bit for processing core 204. Thus, a signal 244 may be used to turn the power either on or off for the entire processing core 202. A signal 246 may be used to turn the power either on or off for the entire processing core 204. Signals 244 and 246, when indicating that power should be turned off, override the signals to the individual sub-elements in that core. In this manner, power to all sub-elements in processing core 202 is turned off when the bit in control register 236 that is coupled to signal 244 is cleared. When the bit in control register 236 that is coupled to signal 244 is set, power to each sub-element in processing core 202 is controlled individually by the bits in control register 236 as described above.

Power is provided in a microprocessor chip typically through the use of a power plane. Each hardware element and sub-element will typically receive power at many different locations within the element. There may be as many as hundreds of locations within an element where power is provided. According to the present invention, power control 236 is coupled to an element's power distribution.

For example, L2 cache 206 includes a power distribution mechanism 238. Power distribution mechanism 238 is meant to depict all of the locations within element 206 where power is provided. For simplicity, only one block 238 is depicted. Those skilled in the art will recognize, however, that block 238 includes hundreds or even thousands of locations within element 206 where power is provided from a power plane (not shown) in microprocessor chip 200.

In order to control power to element 206, a signal 240 is provided from power control 218 to element 206. Signal 240 is distributed throughout element 206 to each location within element 206 where power is provided. Signal 240 is used to control whether the power is turned-on or turned-off. For example, a transistor may be provided at each location where power is received from the power plane. Signal 240 could then be used to turn the transistor either on or off which in turn will control whether power is being received or whether it is not being received at that location. Those skilled in the art will also recognize that other mechanisms could be used to distribute power and to control whether that power is being received within an element.

Signal 240 is depicted as being received within power distribution mechanism 238. This should be understood to illustrate signal 240 being distributed throughout mechanism 238 to each location where power is provided to element 206.

Each hardware element may also include a storage device. For example, L2 cache 206 includes storage 242. Storage 242 may be used to store state information for element 206 prior to element 206 being powered-off. Storage 242 may also be used to store default state information or initialization information for the element. In this manner, when element 206 is powered back on after being powered-off, element 206 may be used immediately without the need for initializing element 206. The stored state or initialization information could be recovered for and loaded into an element from that element's storage device so that the element may be used immediately after being powered-on.

For example, at the beginning of the next time period, or time slice, the hypervisor can select a virtual processor which requires a processing core having one floating point unit, one load/store unit, and one encryption unit. After this virtual processor is selected, the hypervisor selects a physical processing core that will be used to execute this virtual processor. The hypervisor may select, for example, processing core 202 having FPU1 220, ISU 224, FXU 226, IFU/BXU 238, LSU 1 232, and encryption unit 217. Assume that FPU1 220, FPU 2 222, ISU 224, FXU 226, IFU/BXU 238, LSU 1 232, and LSU 2 234 are currently all powered-on. Just prior to dispatching the virtual processor to these elements and sub-elements so they can begin executing the virtual processor, hypervisor will access control register 236 to set the bits for FPU1 220, ISU 224, FXU 226, IFU/BXU 238, and LSU 1 232, encryption unit 217, and L2 cache 206, and clear the bits for FPU 2 222 and LSU 2 234, and for encryption unit 216. Control register 236 then generates the appropriate signal for each element and sub-element that indicates whether the associated bit is set or cleared. The signal generated by control register 236 for an element or sub-element is then distributed throughout that element or sub-element in order to either permit power to be received or turn power off to that element or sub-element. Thus, power remains turned on for FPU1 220, ISU 224, FXU 226, IFU/BXU 238, and LSU 1 232. Power to FPU 2 222 and LSU 2 234 is turned off. Power to encryption unit 217 is also turned on while power to encryption unit 216 remains turned off.

Figure 3:
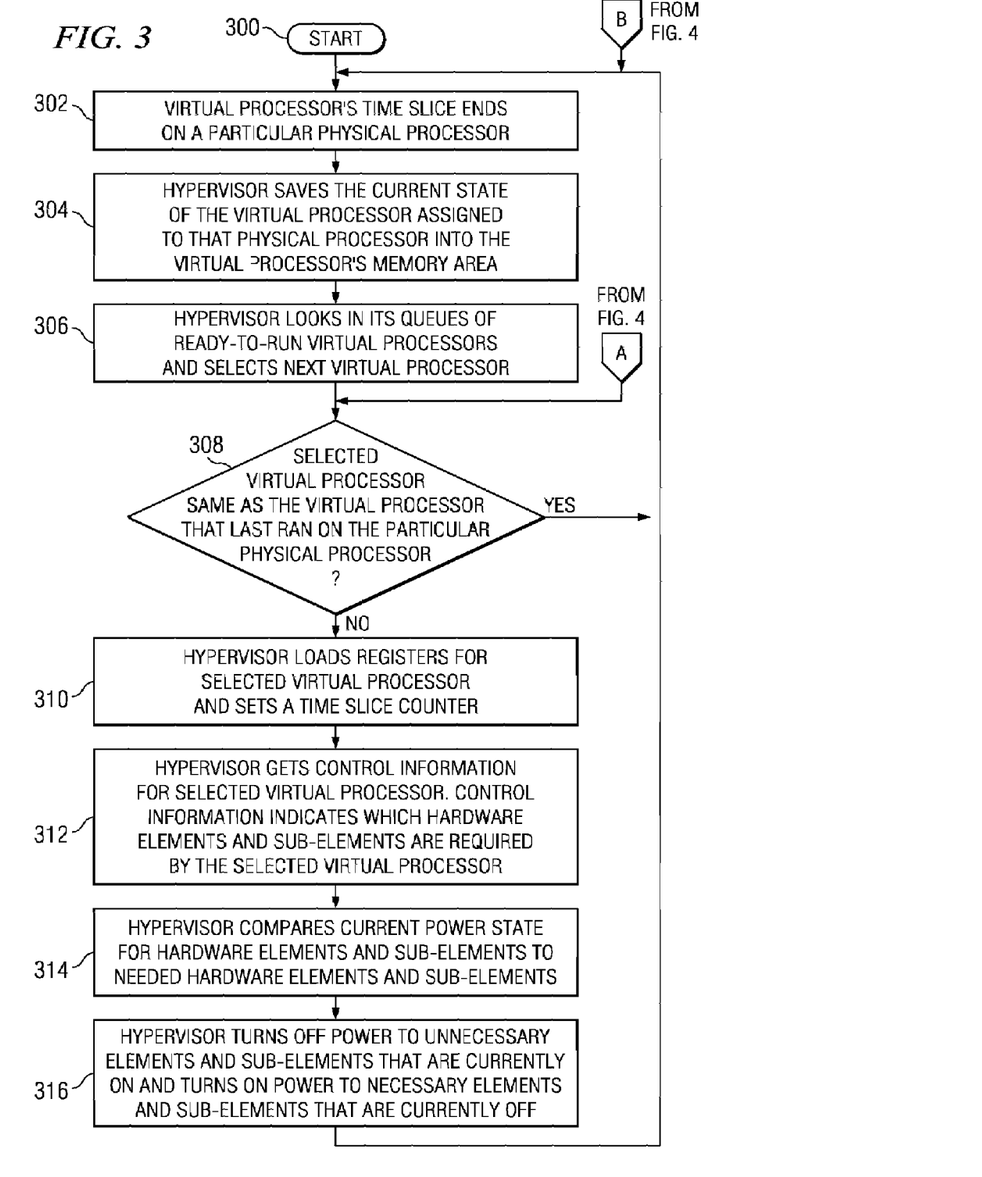
FIG. 3 depicts a high level flow chart which illustrates dynamically managing power within a microprocessor chip when a hardware element, such as a processing core included in the microprocessor chip, becomes available due to a first event in accordance with the present invention.

FIG. 3 depicts a high level flow chart which illustrates dynamically managing power within a microprocessor chip when a hardware element, such as a processing core, included in the microprocessor chip becomes available due to a first event in accordance with the present invention. The process starts as depicted by block 300 and thereafter passes to block 302 which illustrates a virtual processor's time slice ending on a particular physical processing core. Next, block 304 depicts the hypervisor saving the current state of the virtual processor that is assigned to the particular physical processor into the virtual processor's memory area. Block 306, then, illustrates the hypervisor looking in its queues of ready-to-run virtual processors and selecting the next virtual processor from the queue. The choice of which virtual processor to run next can be based on any of several different algorithms. For example, the choice of virtual processor could be based on a round-robin algorithm. More commonly it would be based on a priority scheme in which the virtual processors are given weights which determine the share of the physical processor resources they should receive.

The process then passes to block 308 which depicts a determination of whether or not the virtual processor that was selected is the same as the virtual processor that last ran on this particular physical processor. If the selected virtual processor to be dispatched to a particular physical processor is the same as the one that last ran on the particular physical processor, then most of the virtual processor state and all of the control information is already set and need not be reloaded. Therefore, if a determination is made that the selected virtual processor is the same as the last virtual processor that ran on this particular physical processor, the process passes back to block 302.

Referring again to block 308, if a determination is made that the selected virtual processor is not the same as the last virtual processor that ran on this particular physical processor, the process passes to block 310 which illustrates the hypervisor loading registers for the selected virtual processor and setting a time slice counter.

The process then passes to block 312 which depicts the hypervisor getting control information for the selected virtual processor. The control information indicates which hardware elements and sub-elements are required by the selected virtual processor. Next, block 314 illustrates the hypervisor comparing the current power state for the hardware elements and sub-elements to the power state for the necessary hardware elements and sub-elements that are needed by the selected virtual processor. Even if the next virtual processor is different from the last virtual processor, if the next virtual processor requires the same hardware elements and sub-elements as the prior virtual processor, those hardware elements and sub-elements can remain powered-on and can be used for the next virtual processor. In this manner, the hardware element power control information is correct and need not be reloaded saving the time required by a reload. Thus, the control register is correct for the next time-slice and does not need to be updated.

Thereafter, block 316 depicts the hypervisor turning off unnecessary elements and sub-elements that are currently on and turning on necessary elements and sub-elements that are currently off. The process then passes back to block 302.

When a virtual processor is dispatched to a physical processor that has just been powered on, in the preferred embodiment, the loading of that virtual processors state would generally be done by the newly powered on physical processor as its initial action.

Figure 4:
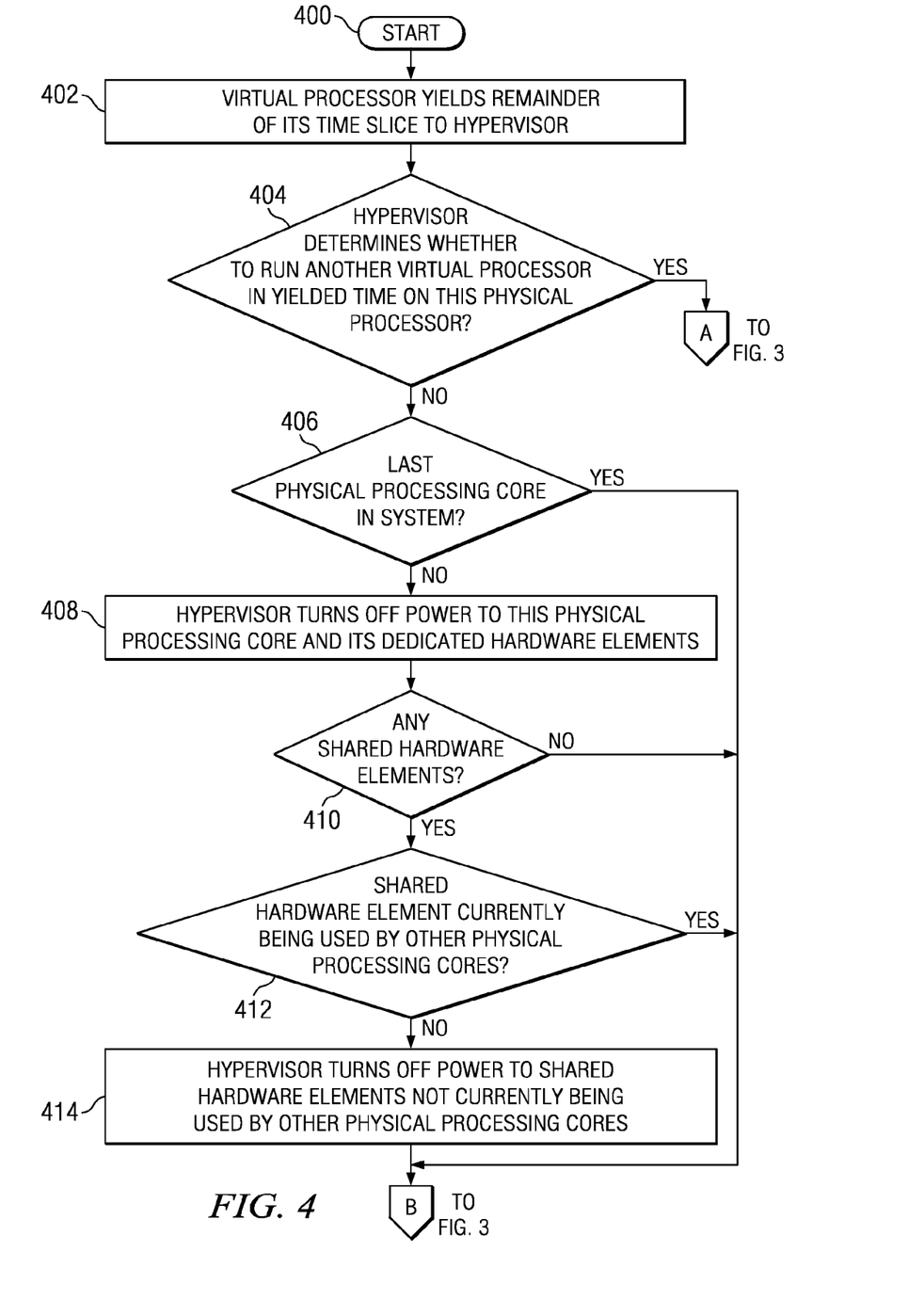
FIG. 4 illustrates a high level flow chart which depicts dynamically managing power within an microprocessor chip when a hardware element, such as a processing core included in the microprocessor chip, becomes available due to a second event in accordance with the present invention.

FIG. 4 illustrates a high level flow chart which depicts dynamically managing power within a microprocessor chip when a hardware element, such as a processing core, included in the microprocessor chip becomes available due to a second event in accordance with the present invention. The process starts as depicted by block 400 and thereafter passes to block 402 which illustrates a virtual processor yielding to the hypervisor the remainder of that virtual processor's unexpired time slice that was allocated to the virtual processor to use a particular processing core.

Next, block 404 depicts a determination by the hypervisor of whether to run another virtual processor in the yielded time on that physical processor. If a determination is made by the hypervisor to run another virtual processor in the yielded time, the process passes back to block 308 depicted in FIG. 3. Referring again to block 404, illustrated in FIG. 4, if a determination is made by the hypervisor not to run another virtual processor in the yielded time, the process passes to block 406 which depicts a determination of whether the particular processing core is the last processing core in the system. If a determination is made that the particular physical processing core is the last processing core in the system, the process passes back to block 302 depicted in FIG. 3.

Referring again to block 406 in FIG. 4, if a determination is made that the particular physical processing core is not the last physical processing core in the system, the process passes to block 408 which illustrates the hypervisor turning off power to this particular physical processing core and the physical processing core's dedicated hardware elements. A physical processing core may have one or more hardware elements that are dedicated to and used exclusively by the physical processing core. In addition, a physical processing core may share one or more hardware elements with another physical processing core. When a hardware element is shared, it is not used exclusively by just one physical processing core. For example, an microprocessor chip could include two encryption engines. A virtual processor may require only one encryption engine. In this case, one of the encryption engines may be dedicated to the exclusive use of one processing core, while the remaining encryption engine is shared among the remaining processing cores in that microprocessor chip.

Block 410, then, depicts a determination of whether or not the particular physical processing core uses any shared hardware elements. If a determination is made that the physical processing core does not use any shared hardware elements, the process passes back to block 302 depicted in FIG. 3. Referring again to block 410, if a determination is made that the physical processing core does use one or more hardware elements that it shares with another processing core, the process passes to block 412 which illustrates a determination of whether or not the shared hardware element is currently being used by another processing core.

If a determination is made that the shared hardware element is not currently being used by another processing core, the process passes to block 414 which depicts the hypervisor turning off power to the shared hardware elements that are not currently being used by another physical processing core. The process then passes back to block 302 depicted in FIG. 3. Referring again to block 412 in FIG. 4, if a determination is made that the shared hardware element is currently being used by another physical processing core, the process passes back to block 302 depicted in FIG. 3.

Figure 5:
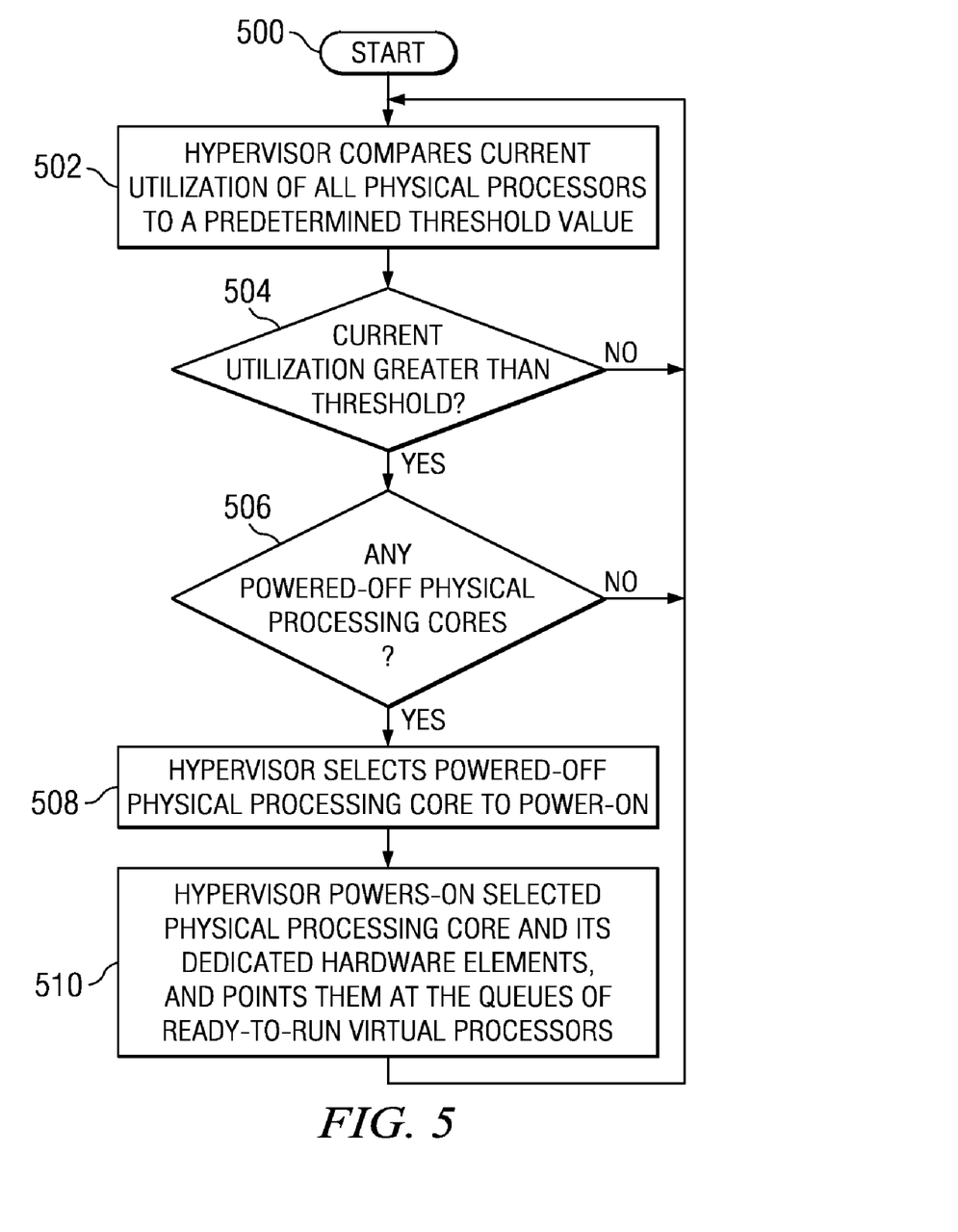
FIG. 5 depicts a high level flow chart which illustrates dynamically managing power within a microprocessor chip when the total utilization of the hardware elements included in the microprocessor chip has exceeded a predetermined threshold in accordance with the present invention.

FIG. 5 depicts a high level flow chart which illustrates dynamically managing power within a microprocessor chip when the total utilization of the hardware elements included in the microprocessor chip has exceeded a predetermined threshold in accordance with the present invention. The process starts as depicted by block 500 and thereafter passes to block 502 which illustrates the hypervisor comparing the current utilization of all physical hardware elements in the microprocessor chip to a predetermined threshold value. Any suitable threshold value may be used, and any suitable method may be used to set the threshold value.

Next, block 504 depicts a determination of whether or not the current average processor utilization is greater than the threshold. If a determination is made that the current utilization is not greater than the threshold, the process passes back to block 502.

Referring again to block 504, it a determination is made that the current utilization is greater than the threshold, the process passes to block 506 which illustrates a determination of whether or not there are any physical processing cores that are currently powered-off. If a determination is made that there are no physical processing core that are currently powered off, the process passes back to block 502.

Referring again to block 506, if a determination is made that there is at least one physical processing core that is currently powered-off, the process passes to block 508 which illustrates the hypervisor selecting a powered-off physical processing core to power-on. Next, block 510 depicts the hypervisor turning on full power to the selected physical processing core and its dedicated hardware elements. The newly powered-on physical processing core and its dedicated hardware elements are then pointed at the queues of ready-to-run virtual processors. The process then passes back to block 502.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

Those of ordinary skill in the art will also appreciate that the current invention can be used during the function or reliability testing of microprocessors to limit the peak power consumed by the microprocessor under test. Although the preferred embodiment uses a hypervisor to direct the setting of control register 236, it should be understood that suitable microprocessor hardware could be provided to allow testing equipment to manipulate the control register directly.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus in a symmetric multiprocessor server for dynamically managing power in a microprocessor chip included in the symmetric multiprocessor server, the microprocessor chip including a plurality of hardware elements, the plurality of hardware elements including a plurality of physical processing cores, the apparatus comprising:
   a virtual processor to be dispatched;
   ones of the plurality of hardware elements to which to dispatch the virtual processor, the ones of the plurality of hardware elements being used to execute the virtual processor being dispatched, the ones of the plurality of hardware elements including one of the plurality of physical processing cores; and
   means for powering-on the ones of the plurality of hardware elements from a powered-off, non-idled state while the virtual processor is dispatched.

2. The apparatus according to claim 1, further comprising:
   means for powering-off second ones of the plurality of hardware elements identified as not being used to execute the virtual processor.

3. The apparatus according to claim 1, further comprising:
   means for controlling power to each of the plurality of hardware elements independently and separately from all others of the plurality of hardware elements.

4. The apparatus according to claim 3, further comprising:
   a control register in the microprocessor chip wherein the control register separately controls power to each of the plurality of the hardware elements.

5. The apparatus according to claim 4, further comprising:
   a separate bit included in the control register for each of the plurality of hardware elements, forming a plurality of separate bits;
   for each of the plurality of hardware elements, a hypervisor for determining whether a corresponding one of the plurality of separate bits is set;
   in response to a first separate bit being set for a first one of the plurality of hardware elements, means for powering-on the first one of the plurality of hardware elements; and
   in response to a second separate bit being cleared for a second one of the plurality of hardware elements, means for powering-off the second one of the plurality of hardware elements.

6. The apparatus according to claim 5, further comprising:
   means for powering-on second ones of the plurality of hardware elements wherein a first corresponding ones of the plurality of separate bits is set for the second ones of the plurality of hardware elements; and
   means for powering off third ones of the plurality of hardware elements wherein a second corresponding ones of the plurality of separate bits is cleared for the third ones of the plurality of hardware elements.

7. The apparatus according to claim 1, further comprising:
   stored control information for the virtual processor that is used prior to dispatching the virtual processor, the control information identifying types of hardware elements that are necessary to execute the virtual processor.

8. The apparatus according to claim 1, further comprising:
   a next virtual processor to be dispatched;
   second ones of the plurality of hardware elements to which to dispatch the next virtual processor, the second ones of the plurality of hardware elements being used to execute the next virtual processor, the second ones of the plurality of hardware elements including a second one of the plurality of physical processing cores;
   third ones of the plurality of hardware elements that are already powered-on that are not included in the second ones of the plurality of the hardware elements; and
   means for powering-off power to the third ones of the plurality of hardware elements.

9. The apparatus according to claim 8, further comprising:
   prior to selecting the next virtual processor to be dispatched, a state of the virtual processor including information that identifies the second ones of the plurality of hardware elements used to execute the next virtual processor, wherein the state is utilized to identify ones of the plurality of hardware elements that are already powered-on.

10. The apparatus according to claim 9, further comprising:
    control information for the next virtual processor that is used prior to dispatching the next virtual processor, the control information identifying types of hardware elements that are necessary to execute the next virtual processor; wherein
    the state and the control information for the next virtual processor is utilized to identify the third ones of the plurality of hardware elements.

11. The apparatus according to claim 1, further comprising:
    means for comparing a current utilization of the plurality of physical processing cores to a predetermined threshold;
    in response to current utilization exceeding the predetermined threshold, means for determining whether the plurality of physical processing cores includes a powered-off processing core; and
    in response to determining that the plurality of physical processing cores includes the powered-off processing core, means for powering-on the powered-off processing core.

12. The apparatus according to claim 1, further comprising:
    during a dispatch process:
    means for determining whether power to the plurality of hardware elements is to be altered; and
    in response to determining to alter power, means to alter power to the plurality of hardware elements only during the dispatch process.

13. The apparatus according to claim 1, further comprising:
    a hypervisor for identifying the ones of the plurality of hardware elements; and
    the hypervisor being capable of powering-on the ones of the plurality of hardware elements.

14. The apparatus according to claim 1, further comprising:
    a next virtual processor being dispatched upon an expiration of a particular period of time; and
    during a time required to dispatch the next virtual processor, means for powering-on power to the ones of the plurality of hardware elements while the virtual processor is being dispatched, and means for powering-off second ones of the plurality of hardware elements identified as not used to execute the virtual processor.

15. The apparatus according to claim 1, further comprising:
    means for controlling power to the plurality of individual hardware elements during testing procedures of the microprocessor chip to limit a total microprocessor chip power dissipation during the testing procedures.

16. An apparatus for dynamically managing power in a microprocessor chip that includes a plurality of hardware elements, each of the plurality of hardware elements including a one of a plurality of physical processing cores, the apparatus comprising:

a plurality of hardware sub-elements included in each one of the plurality of physical processing cores;

means for executing a process on ones of the plurality of hardware sub-elements included in one of the plurality of physical processing cores; and     means for powering-on power to the ones of the plurality of hardware sub-elements from a powered-off, non-idled state, wherein power to each of the plurality of hardware sub-elements of a single processing core of the plurality of physical processing cores is controlled separately from power to all others of the plurality of hardware sub-elements in the single processing core of the plurality of physical processing cores.

17. The apparatus according to claim 16, further comprising:

means for powering-off power to second ones of the plurality of hardware sub-elements.

18. The apparatus according to claim 16, further comprising:

means for controlling power to each of the plurality of hardware sub-elements independently and separately from all others of the plurality of hardware sub-elements.

19. The apparatus according to claim 18, further comprising:

a control register included in the microprocessor chip, wherein     power to each of the plurality of hardware sub-elements is controlled separately utilizing the control register.

20. The apparatus according to claim 19, further comprising:

a separate bit included in the control register for each one of the plurality of hardware sub-elements, forming a plurality of separate bits;

for each one of the plurality of hardware sub-elements, a hypervisor for determining whether a corresponding one of the plurality of separate bits is set;

in response to a first separate bit being set for a first one of the plurality of hardware sub-elements, means for powering-on the first one of the plurality of hardware sub-elements; and     in response to a second separate bit being cleared for a second one of the plurality of hardware sub-elements, means for powering-off the second one of the plurality of hardware sub-elements.

21. The apparatus according to claim 20, further comprising:

means for powering-on second ones of the plurality of hardware sub-elements wherein a first corresponding ones of the plurality of separate bits is set for the second ones of the plurality of hardware elements; and     means for powering-off third ones of the plurality of hardware sub-elements wherein a second corresponding ones of the plurality of separate bits is cleared for the third ones of the plurality of hardware elements.

22. A computer program product for dynamically managing power in a microprocessor chip included in a symmetric multiprocessor server, the microprocessor chip including a plurality of hardware elements, the plurality of hardware elements including a plurality of physical processing cores, the product comprising:

first instructions for selecting a virtual processor to be dispatched;

second instructions for identifying ones of the plurality of hardware elements to which to dispatch the virtual processor, the ones of the plurality of hardware elements being used to execute the virtual processor, the ones of the plurality of hardware elements including one of the plurality of physical processing cores; and     third instructions for powering-on from a powered-off, non-idled state the ones of the plurality of hardware elements while the virtual processor is being dispatched.

\* \* \* \* \*